United States Patent [19]

Schwab et al.

[11] 4,311,424
[45] Jan. 19, 1982

[54] PICK-OFF DEVICE FOR AN AUTOMATIC STACKER

[75] Inventors: Rolf Schwab, Bischofsheim; Herbert Stralka, Bad Neustadt, both of Fed. Rep. of Germany

[73] Assignee: Siemens Aktiengesellschaft, Munich, Fed. Rep. of Germany

[21] Appl. No.: 43,214

[22] Filed: May 29, 1979

[30] Foreign Application Priority Data

Jul. 21, 1978 [DE] Fed. Rep. of Germany ....... 2832210

[51] Int. Cl.³ .............................................. B65G 61/00
[52] U.S. Cl. ....................................... 414/27; 29/732; 29/738; 414/114; 414/330
[58] Field of Search ................. 414/27, 112, 113, 114, 414/330, 684, 908, 911; 29/609, 732, 738; 294/86 R

[56] References Cited

U.S. PATENT DOCUMENTS

| 2,896,311 | 7/1959 | Stafford et al. | 29/738 X |
| 2,954,881 | 10/1960 | Hopton et al. | 414/330 |
| 3,006,062 | 10/1961 | Loy | 29/738 X |
| 4,079,512 | 3/1978 | Lakes | 414/114 |

Primary Examiner—Leslie J. Paperner

Attorney, Agent, or Firm—Kenyon & Kenyon

[57] ABSTRACT

A pick-off device for an automatic stacker useful in stacking laminations for electric machines in which the number of laminations required to form a stack is picked off by means of a head from an orderly supply of laminations stored in a magazine. The pick-off head can be tilted so that the picked-off lamination stack can be fed to a further processing station. In order to prevent individual laminations from dropping out when they are being picked off and to make it possible to vary the number of laminations picked-off, the laminations are arranged in the magazine on a horizontal carrier which is lined up with a take-up mandrel of the pick-up head, being aligned on the carrier by a guide bar connected to it. The take-up mandrel has a pick-off finger which fits into a cutout in the laminations and can be lifted relative to the carrier alone or together with the take-up mandrel to pick off the laminations. The lifting of the finger or mandrel is triggered by a device for measuring the size of the lamination stack. When the lamination stack, pushed onto the take-up mandrel, has been separated from the laminations on the carrier, the lamination stack is axially retained on the take-up mandrel by controlled holding elements.

9 Claims, 3 Drawing Figures

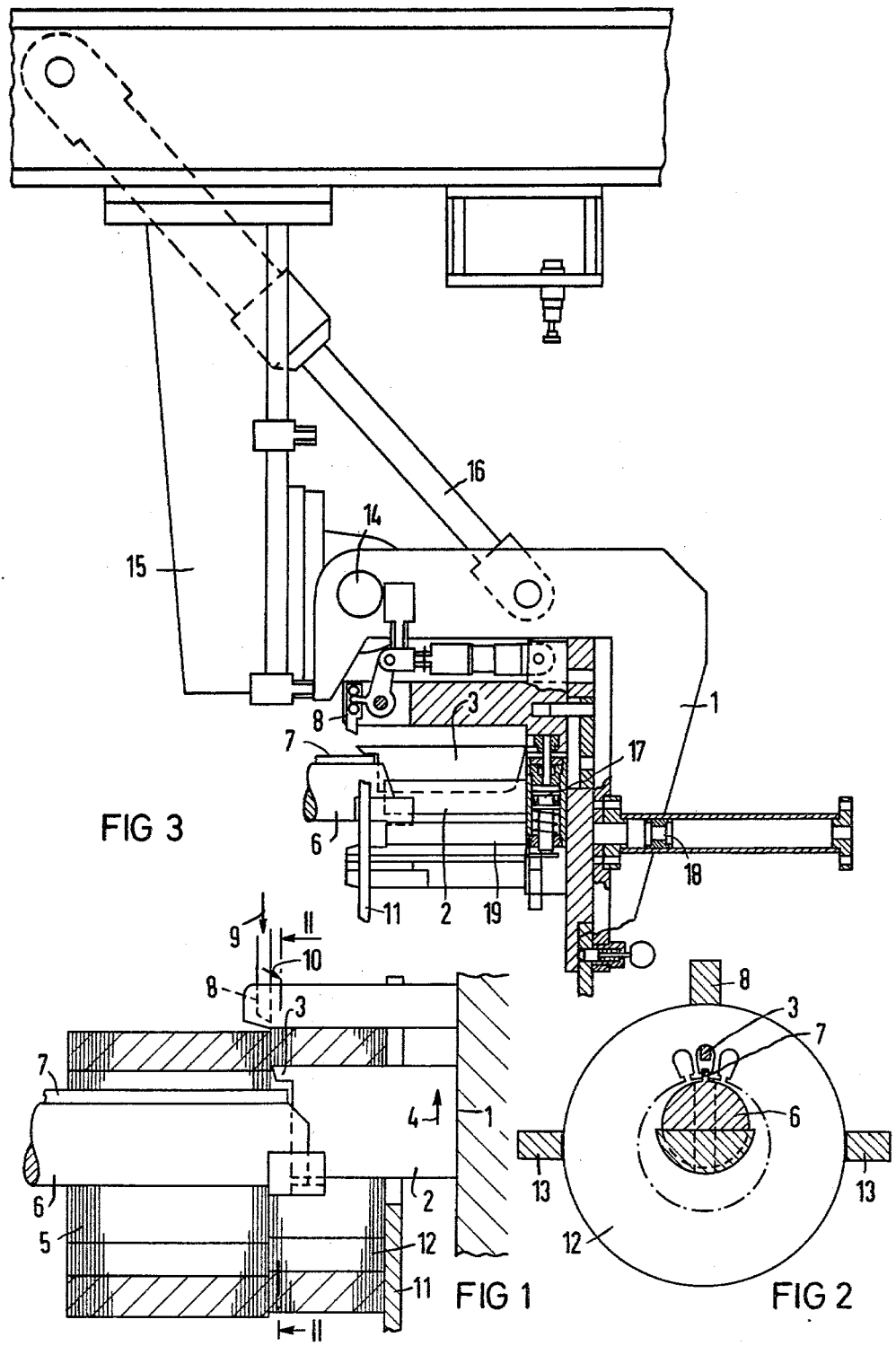

PICK-OFF DEVICE FOR AN AUTOMATIC STACKER

BACKGROUND OF THE INVENTION

1. Field of the Invention

This invention relates to a pick-off device for an automatic stacker used in the production of lamination stacks for electric machines, wherein the number of laminations required for forming a lamination stack is picked-off by a pick-off head from an orderly supply of laminations stored in a magazine and is passed on to a further processing station by tilting the pick-off head.

2. Discussion of the Prior Art

Such a pick-off device is described in German Offenlegungsschrift No. 20 14 615. In this pick-off device, holding parts are provided which pick-off a given number of laminations from the supply stored in the magazine. The magazine is arranged at an angle to the pick-off head and the pick-off head can be slewed horizontally. Because the pick-off motion is at an angle to the plane of the stator laminations, the laminations are reliably separated, in spite of any stamping burr. Due to the inclined position of the magazine, other holding parts are necessary to hold the laminations in the magazine. Laminations, which are not held by the holding parts of the pick-off head or the holding parts of the magazine, drop out of the magazine. These laminations must then be removed from the automatic stacker and replaced in the magazine.

It is an object of the invention to provide a pick-off device for an automatic stacker which keeps individual laminations from dropping out of the magazine containing the supply and, at the same time, eliminates the need for additional holding elements at the magazine.

BRIEF DESCRIPTION OF THE INVENTION

In accordance with the present invention the above problem is solved by arranging the laminations, in the magazine, on a carrier member which is lined up with a take-up mandrel carried by the pick-up head. The laminations are kept in alignment by a guide bar which is connected to the carrier and which extends through the cutouts in the laminations. The take-up mandrel is provided with a pick-up finger which also fits into the cutouts in the laminations. Vertical motion of the pick-up finger, alone or together with the mandrel, is triggered by a measuring device which determines the size of the lamination stack by measuring the distance travelled by the outermost lamination as it is pushed onto the take-up mandrel. After being lifted, the lamination stack is held against axial movement on the take-up mandrel by controlled holding elements. Because the carrier is arranged horizontally, no separate parts are necessary to hold the laminations on it. The raising motion of the take-up mandrel or the pick-off finger, separates the laminations from each other perfectly. If a lamination is not fully gripped by the pick-off finger, it can only fall back on to the carrier and therefore remains in the supply. The number of laminations to be picked each time from the supply can be changed by means of the measuring device controlling the lifting of the pick-off finger. For this purpose it is only necessary to set a different value at the measuring device. No other adjustments at the pick-up head or other parts of the pick-off device are necessary for this purpose. It is a feature of the invention that the pick-off finger picks up only at one point on the circumference of the stacked laminations. Possible difficulties arising from variations in lamination thickness, when pick-up occurs at two or more points on the circumference of the lamination stack, are thus avoided.

An advantageous feature of the invention is that the carrier is a rod on which the laminations hang. By means of the lamination hanging arrangement, a stable position of the laminations is assured. Also, the height of the guide bar is made larger than the lifting stroke of the pick-off finger or take-up mandrel; a lamination which falls back retains its appropriate position with certainty.

To make it impossible for laminations having a heavy stamping burr to stick, a stripping finger is provided which is axially offset relative to the tip of the pick-off finger by one lamination thickness. It is moved toward the lamination supply when the pick-off finger or the take-up mandrel is lifted. The stripping finger also executes an axial motion towards the pick-off finger which shifts the picked-up laminations axially on the take-up mandrel. Holding fingers can then engage the picked-off stack in the space so produced between the supply remaining on the carrier and the newly picked-off lamination stack. These holding fingers secure the picked-off laminations on the take-up mandrel when the pick-off head is tilted.

The size of the picked-off lamination stack can be determined in a simple manner by means of a setting member which is coupled to a length measuring device and which, lying parallel to the pick-up mandrel, is axially shifted by the laminations when they are pushed on to the pick-off finger. When the predetermined size of the lamination stack is reached, the setting member triggers a control command which stops the motion pushing onto the take-up mandrel and initiates the lifting motion of the pick-off finger and the appropriate motion of the stripping finger.

BRIEF DESCRIPTION OF THE DRAWINGS

FIG. 1 is a side view of a schematic presentation of a pick-off device according to the teachings of the invention;

FIG. 2 is a view in cross-section along line II—II of FIG. 1; and

FIG. 3 is a pick-off device embodying the teachings of the invention.

DETAILED DESCRIPTION OF THE INVENTION

In FIG. 1, a pick-off head 1, to which a take-up mandrel 2 is fastened, carries a pick-off finger 3. The lifting motion of take-up mandrel 2 along with pick-off finger 3 is indicated by an arrow 4. A carrier rod 6 provides an orderly supply of laminations 5. A guide bar 7, on the top of rod 6 is connected thereto and engages in a slot of each lamination to guide it on rod 6. A stripping finger 8 is also arranged on pick-off head 1 and, upon command, executes a downward motion indicated by the arrow 9 and an axial motion indicated by the arrow 10. Furthermore, a setting member 11 is provided which is coupled to a measuring device; it is moved in the axial direction when the laminations are pushed onto pick-off finger 3 of take-up mandrel 2. When a number of laminations corresponding to the desired size of the lamination stack, as determined by the setting of measuring finger 11, has been pushed on to pick-off finger 3, finger 3 together with take-up mandrel 2, are raised, as indicated by the arrow 4. This lifting separates the laminations which have been pushed onto pick-off finger 3 from the laminations remaining on rod 6. By means of the stripping finger 8, a surplus lamination, which may still be stuck to the lifted lamination stack, is stripped off and drops back onto rod 6. Clearance between the tip of pick-off finger 3 and stripping finger 8 is assured by spacing them apart, axially, a distance equal to the thickness of a lamination.

As can be seen in FIG. 2, the tip of pick-off finger 3 engages the same slot in each lamination into which guide bar 7 also protrudes. The width of guide bar 7 is proportioned to the slot aperture so as to guide the laminations exactly. In addition, the height of guide bar 7 is made larger than the stroke of the take-up mandrel so that a lamination stripped off by stripping finger 8 retains its position on rod 6 with certainty. FIG. 2 also shows, schematically, side holding elements 13 which can move into the space formed between lamination stack 12 and lamination supply 5 left on rod 6 after lamination stack 12 has been shifted axially on take-up mandrel 2 by pick-off finger 8. Lamination stack 12 is thus on take-up mandrel 2.

Actual parts corresponding to those schematically presented in FIGS. 1 and 2 are provided with the same reference symbols in a preferred embodiment of the invention illustrated in FIG. 3. Pick-up head 1 is hinged to a machine frame 15 by means of a joint 14. Pick-up head 1 can be lifted, swinging 90°, by means of hydraulic actuating rod 16. Take-up mandrel 2, together with pick-off finger 3, can be lifted via a hydraulic drive 17. As can also be seen, a setting member 11 is provided, which is supported by a guide rod 19 and is coupled to a hydraulic piston 18. The distance through which setting member 11 travels is measured by means of measuring elements not shown in the drawing. When a predetermined distance has been travelled, the motion pushing the laminations onto pick-up finger 3 is stopped. Then take-up mandrel 2 and pick-off finger 3 are lifted by hydraulic drive 17. Thereupon, the stripping-off finger 8 is also actuated by hydraulic drive. After the lamination stack has been moved in the axial direction on pick-up finger 3 by the action of stripping finger 8, holding elements 13 move to secure the stripped-off lamination stack on take-up mandrel 2. Pick-up head 1 is then tilted 90° and the lamination stack carried on take-up mandrel 2 is available for deposit on a plunger which is brought under the rotated pick-off head 1. The lamination stack deposited on the plunger is fed to a further processing station.

Pick-off finger 3 is detachably connected to take-up mandrel 2, so that it can be replaced. Pick-off finger 3 also engages a slot provided in the end of rod 6, so that rod 6 and the pick-off finger 3 are axially aligned. Also, the tip of pick-off finger 3 extends, axially, beyond guide bar 7, ensuring that a lamination removed by stripping finger 8 remains with certainty on rod 6 and cannot drop out.

What is claimed is:

1. In a pick-off device for an automatic stacker useful in producing stacked laminations for electric machines wherein the number of laminations required for forming a lamination stack are picked off by means of a pick-off head from an orderly supply of laminations stored in a magazine and are passed on to a further processing station by tilting the pick-off head, the improvement, for use in an automatic stacker in which the laminations are pushed onto the pick-off head to form the lamination stack, comprising:

a take-up mandrel on the pick-off head onto which the laminations are pushed;

a horizontal carrier and a guide bar connected to the carrier for carrying the laminations aligned in the magazine, the carrier being aligned with the take-up mandrel;

a pick-off finger on the take-up mandrel which fits into cutouts in the laminations;

means for lifting the pick-off finger vertically relative to the carrier to pick-off at least one lamination;

means responsive to the size of the stack for triggering the means for lifting the pick-off finger when a predetermined number of laminations have been pushed onto the take-up mandrel; and controlled holding elements for axially retaining the lamination stack on the take-up mandrel when the mandrel is tilted.

2. An improved pick-off device in accordance with claim 1 in which the lifting means raise the pick-off finger and the mandrel together.

3. An improved pick-off device in accordance with claim 1, in which the carrier is a rod on which the laminations hang.

4. An improved pick-off device in accordance with claim 1, in which the distance the pick-off finger is lifted is less than the height of the guide bar.

5. A pick-off device in accordance with claim 3, in which the distance the pick-off finger is lifted is less than the height of the guide bar.

6. An improved pick-off device in accordance with any one of claims 1, 3, 4, and 5 and further comprising:

a stripping finger supported in a position axially offset from the tip of the pick-off finger by a distance equal to at least one lamination thickness; and means for moving the stripping finger toward the supply of laminations when the pick-off finger is lifted.

7. An improved pick-off device in accordance with claim 6 further comprising means for moving the stripping finger axially towards the pick-off finger.

8. In an improved pick-off device in accordance with claim 6 in which the means responsive to stack size comprises a setting member coupled to a length measuring device which is mounted for motion parallel to the take-up mandrel and which responds to movement of the laminations when they are pushed onto the mandrel.

9. An improved pick-off device in accordance with any one of claims 1 to 4 in which the means responsive to stack size comprises a setting member coupled to a length measuring device which is mounted for motion parallel to the take-up mandrel and which responds to movement of the laminations when they are pushed onto the mandrel.

* * * * *